US008656183B2

(12) United States Patent
Grab et al.

(10) Patent No.: US 8,656,183 B2
(45) Date of Patent: Feb. 18, 2014

(54) FEDERATED DIGITAL RIGHTS MANAGEMENT SCHEME INCLUDING TRUSTED SYSTEMS

(75) Inventors: Eric William Grab, San Diego, CA (US); Chris Russell, San Diego, CA (US); Francis Yee-Dug Chan, San Diego, CA (US); Michael George Kiefer, Scottsdale, AZ (US)

(73) Assignee: Sonic IP, Inc., Santa Clara, CA (US)

( * ) Notice: Subject to any disclaimer, the term of this patent is extended or adjusted under 35 U.S.C. 154(b) by 0 days.

(21) Appl. No.: 13/489,409

(22) Filed: Jun. 5, 2012

(65) Prior Publication Data

US 2013/0019107 A1   Jan. 17, 2013

Related U.S. Application Data

(63) Continuation of application No. 12/411,271, filed on Mar. 25, 2009, now Pat. No. 8,201,264, which is a continuation of application No. 11/685,929, filed on Mar. 14, 2007, now Pat. No. 7,515,710.

(60) Provisional application No. 60/782,215, filed on Mar. 14, 2006.

(51) Int. Cl.
 *G06F 21/22* (2006.01)
(52) U.S. Cl.
 USPC ............... 713/189; 713/156; 726/30; 726/6; 726/26; 726/27; 726/32; 726/33; 380/200; 380/201
(58) Field of Classification Search
 USPC ........ 726/30, 6, 26, 27, 32, 33; 713/156, 187; 380/200, 201
 See application file for complete search history.

(56) References Cited

U.S. PATENT DOCUMENTS 5,502,766 A * 3/1996 Boebert et al. ................ 713/193
5,509,070 A   4/1996 Schull (Continued)

FOREIGN PATENT DOCUMENTS

WO        0237210  A2    5/2002
WO    WO02/37210  A2    5/2002

(Continued)

OTHER PUBLICATIONS

"Information Technology-Coding of Audio Visual Objects—Part 2: Visual" International Standard, ISO/IEC 14496-2, Third Edition, Jun. 1, 2004, pp. 1-706.

(Continued)

*Primary Examiner* — Kambiz Zand
*Assistant Examiner* — Tongoc Tran
(74) *Attorney, Agent, or Firm* — KPPB LLP

(57) ABSTRACT

Federated systems for issuing playback certifications granting access to technically protected content are described. One embodiment of the system includes a registration server connected to a network, a content server connected to the network and to a trusted system, a first device including a non-volatile memory that is connected to the network and a second device including a non-volatile memory that is connected to the network. In addition, the registration server is configured to provide the first device with a first set of activation information in a first format, the first device is configured to store the first set of activation information in non-volatile memory, the registration server is configured to provide the second device with a second set of activation information in a second format, and the second device is configured to store the second set of activation information in non-volatile memory.

18 Claims, 12 Drawing Sheets

(56) References Cited

U.S. PATENT DOCUMENTS

| | | | |
|---|---|---|---|
| 5,715,403 A * | 2/1998 | Stefik | 705/44 |
| 5,754,648 A | 5/1998 | Ryan et al. | |
| 5,805,700 A | 9/1998 | Nardone et al. | |
| 5,892,900 A | 4/1999 | Ginter et al. | |
| 5,999,812 A | 12/1999 | Himsworth | |
| 6,044,469 A * | 3/2000 | Horstmann | 726/29 |
| 6,175,921 B1 | 1/2001 | Rosen | |
| 6,282,653 B1 * | 8/2001 | Berstis et al. | 726/26 |
| 6,289,450 B1 * | 9/2001 | Pensak et al. | 713/167 |
| 6,449,719 B1 | 9/2002 | Baker | |
| 6,466,671 B1 | 10/2002 | Maillard et al. | |
| 6,510,513 B1 * | 1/2003 | Danieli | 713/156 |
| 6,810,389 B1 * | 10/2004 | Meyer | 705/59 |
| 6,965,993 B2 | 11/2005 | Baker | |
| 7,007,170 B2 | 2/2006 | Morten | |
| 7,043,473 B1 | 5/2006 | Rassool et al. | |
| 7,150,045 B2 | 12/2006 | Koelle et al. | |
| 7,151,832 B1 | 12/2006 | Fetkovich et al. | |
| 7,151,833 B2 | 12/2006 | Candelore et al. | |
| 7,165,175 B1 | 1/2007 | Kollmyer et al. | |
| 7,185,363 B1 * | 2/2007 | Narin et al. | 726/6 |
| 7,328,345 B2 | 2/2008 | Morten et al. | |
| 7,349,886 B2 | 3/2008 | Morten et al. | |
| 7,356,143 B2 | 4/2008 | Morten | |
| 7,376,831 B2 | 5/2008 | Kollmyer et al. | |
| 7,406,174 B2 | 7/2008 | Palmer | |
| 7,484,103 B2 * | 1/2009 | Woo et al. | 713/189 |
| 7,594,271 B2 | 9/2009 | Zhuk et al. | |
| 7,640,435 B2 | 12/2009 | Morten | |
| 7,817,608 B2 | 10/2010 | Rassool et al. | |
| 8,201,264 B2 | 6/2012 | Grab et al. | |
| 8,261,356 B2 * | 9/2012 | Choi et al. | 726/26 |
| 2001/0046299 A1 | 11/2001 | Wasilewski et al. | |
| 2002/0051494 A1 | 5/2002 | Yamaguchi et al. | |
| 2002/0110193 A1 | 8/2002 | Yoo et al. | |
| 2003/0001964 A1 | 1/2003 | Masukura et al. | |
| 2003/0035488 A1 | 2/2003 | Barrau | |
| 2003/0093799 A1 | 5/2003 | Kauffman et al. | |
| 2003/0174844 A1 | 9/2003 | Candelore | |
| 2003/0185542 A1 | 10/2003 | McVeigh et al. | |
| 2005/0071280 A1 | 3/2005 | Irwin et al. | |
| 2006/0036549 A1 | 2/2006 | Wu | |
| 2006/0052095 A1 | 3/2006 | Vazvan | |
| 2006/0053080 A1 | 3/2006 | Edmonson et al. | |

FOREIGN PATENT DOCUMENTS

| | | |
|---|---|---|
| WO | 02054196 A2 | 7/2002 |
| WO | WO02/054196 A2 | 7/2002 |

OTHER PUBLICATIONS

Cloakware Corporation, "Protecting Digital Content Using Cloakware Code Transformation Technology", Version 1.2, May 2002, pp. 1-10.

International Search Report for International Application No. PCT/US2005/025845 filed Jul. 21, 2005, report completed Feb. 5, 2007 and mailed May 10, 2007, 3 pgs.

International Search Report for International Application No. PCT/US2007/063950 filed Mar. 14, 2007, report completed Mar. 1, 2008; report mailed Mar. 19, 2008, 2 pgs.

Written Opinion for International Application No. PT/US2005/025845 filed Jul. 21, 2005, report completed Feb. 5, 2007 and mailed May 10, 2007, 5 pgs.

Written Opinion for International Application No. PCT/US2007/063950 filed Mar. 14, 2007, report completed Mar. 1, 2008; report mailed Mar. 19, 2008, 6 pgs.

Author Unknown, "Entropy and Source Coding (Compression)", TCOM 570, Sep. 1999, pp. 1-22.

Author Unknown, "MPEG-4 Video Encoder: Based on International Standard ISO/IEC 14496-2", Patni Computer Systems, Ltd., Publication date unknown, 15 pgs.

Blasiak, Ph.D., Dakek, Mar. 5, 2013, Video Transrating and Transcoding: Overview of Video Transrating and Transcoding Technologies, Ingenient Technologies, TI Developer Conference, Aug. 6-8, 2002, 22 pgs.

Nelson, Mark ,"Arithmetic Coding + Statistical Modeling = Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.

Phamdo, Nam, "Theory of Data Compression", printed from http://www.data-compression.com/theoroy.html on Oct. 10, 2003, 12 pgs.

* cited by examiner

FEDERATED DIGITAL RIGHTS MANAGEMENT SCHEME INCLUDING TRUSTED SYSTEMS

CROSS REFERENCE TO RELATED APPLICATIONS

This application is a continuation of application Ser. No. 12/411,271 filed Mar. 25, 2009 which application was a continuation of application Ser. No. 11/685,929 filed Mar. 14, 2007 which claimed priority to U.S. Provisional Application No. 60/782,215, filed Mar. 14, 2006, the disclosures of which are fully incorporated herein by reference.

FIELD OF THE INVENTION

The present invention relates generally to digital rights management schemes and more specifically to playback certification schemes where various playback activities are enabled in a coordinated fashion by different entities within the system.

Providers of multimedia content can digitize content for distribution via digital communication networks. An important issue faced by a content distribution system is enabling only those customers that have purchased the content to play the content and compartmentalize access to all the stakeholders in the content distribution chain. One approach is to encrypt portions of the content and to issue encryption keys to authorized users that enable encrypted portions of the content to be unencrypted. Layers of keys and protection policies can be used so a single encryption key alone is insufficient for the user to access the content. In a number of systems, users purchase players that possess specified decryption capabilities. Content providers can distribute content to user's owning such a player in an encryption format supported by the player. Complying with a specified protection policy typically involves using an encryption key specified by the manufacturer of the players. In many instances the manufacturer of the players will not reveal the encryption keys used in the specified encryption scheme and likewise the content provider does not want to share the content keys to the manufacturer of the players.

SUMMARY OF THE INVENTION

Systems and methods are described for issuing content to devices possessing various playback, decryption and communication capabilities. In a number of embodiments, the variation in the capabilities of devices are supported by providing processes for registering a device to receive content, playing back content on a device and revoking a device's registration that differ in response to the capabilities of different classes of device. Many embodiments of the invention include a single entity for registering devices. The registration entity is configured to register each different class of device. In several embodiments, the registration entity also distributes trusted systems to content providers. The trusted systems enable content providers to issue content with playback certificates. The playback certificates determine the playback capabilities that specific users have with respect to the content and can include at least one piece of information encrypted using an encryption key known only to the content provider. An aspect of many embodiments of the invention is the ability of content providers to issue playback certifications without needing to exchange information with a central registration service.

In many embodiments of the invention there is a central registration device and multiple distributed content services. As part of the registration process, there is a one time sharing of data between the registration service and the content services. In addition, content services can issue secure transactions without needing to contact the central registration service.

One embodiment of the invention includes a registration server connected to a network, a content server connected to the network and to a trusted system, a first device including a non-volatile memory that is connected to the network, and a second device including a non-volatile memory that is connected to the network. In addition, the registration server is configured to provide the first device with a first set of activation information in a first format, the first device is configured to store the first set of activation information in non-volatile memory, the registration server is configured to provide the second device with a second set of activation information in a second format, and the second device is configured to store the second set of activation information in non-volatile memory.

In a further embodiment of the invention, the first and second devices are configured to request content from the content server, the content server is configured to issue technically protected content including multiple playback certifications, and the first device is configured to use the first set of activation information and one of the playback certifications to access the technically protected content.

In another embodiment of the invention, the second device is configured to use the second set of activation information and another of the playback certifications to access the technically protected content.

In a still further embodiment, the first set of activation information is protected by a base encryption key and includes a user encryption key and a random value, the playback certification includes information encrypted using the base encryption key, and the playback certification includes information encrypted using the user encryption key.

In still another embodiment, the information encrypted using the base encryption key and the user encryption key enables playback of the technically protected content.

In a yet further embodiment, the second set of activation information includes the same base encryption key and a different user encryption key.

In yet another embodiment, the second set of activation information includes a different base encryption key and a different user encryption key.

In a further embodiment again, the content server is configured to provide a set of content encryption keys and information concerning the device requesting content to the trusted system, and the trusted system is configured to generate the multiple playback certifications.

In another embodiment again, the registration server is configured to revoke the base encryption key.

In a further additional embodiment, the registration server is configured to revoke the user encryption key.

Another additional embodiment includes, a processor, a storage device connected to the processor, and a network interface device connected to the processor and configured to connect to a network. In addition, the processor is configured to receive registration requests via the network interface device, the processor is configured to generate activation information for transmission via the network interface device, the processor is configured to receive activation confirmations via the network interface device, and the processor is configured to record the completed activation of the device in the storage device.

In a still yet further embodiment, the activation information includes a base encryption key and a user encryption key.

In another still yet further embodiment, the processor is configured to scramble at least some of the activation information.

In a still further embodiment again, the processor is configured to generate multiple base encryption keys and multiple user encryption keys, the activation information includes the multiple base encryption keys and a single user encryption key and information concerning an active base encryption key, the processor is configured to store the multiple base encryption keys and the multiple user encryption keys in the storage device, and the processor is configured to store information indicative of the active base encryption key and the user encryption key included in the activation information in the storage device.

In still another embodiment again, the processor is configured to authenticate the activation confirmation using the activation information.

A still further additional embodiment includes, a processor, a storage device connected to the processor and including stored content, a trusted and opaque system connected to the processor, and a network interface device connected to the processor and configured to be connected to a network. In addition, the processor is configured to receive requests to provide the stored content via the network interface device, the processor is configured to generate encryption keys and encrypt the stored content, the processor is configured to provide information indicative of the request and the encryption keys to the trusted system, the trusted system is configured to provide a playback certification containing at least one encrypted copy of the encryption keys used to encrypt the stored content, and the processor is configured to transmit the encrypted content and the playback certification via the network interface device.

In a yet further embodiment again, the playback certification includes multiple copies of at least one of the encryption keys and each copy is encrypted using a different encryption key.

In yet another embodiment again, the trusted system is configured to provide multiple playback certifications, each playback certification includes at least one encrypted copy of the encryption keys, and each playback certification is formatted differently.

A yet further additional embodiment includes a processor housed within a tamper proof housing, and a communication interface connected to the processor. In addition, the processor is configured to receive requests to generate playback certifications, and each request includes at least one content encryption key and information identifying a user, the trusted system is configured to encrypt the content encryption key using an encryption key associated with the user, and the processor is configured to transmit the playback certification via the communication interface.

In yet another additional embodiment, the processor is configured to generate multiple playback certifications, each playback certification includes information encrypted using a different base encryption key, and each playback certification is formatted differently.

A further additional embodiment again includes a processor, a network interface device connected to the processor and configured to be connected to a network, and a non-volatile memory connected to the processor. In addition, the processor is configured to transmit a registration request via the network interface device, the processor is configured to receive an activation record via the network interface device, the processor is configured to extract activation information from the activation record, the processor is configured to generate an activation confirmation using the activation information, the processor is configured to transmit the activation confirmation via the network interface device, and the processor is configured to store at least some of the activation information in the non-volatile memory.

In another additional embodiment again, the activation information includes a base encryption key and a user encryption key.

In another further embodiment, the activation information includes multiple base encryption keys.

In still another further embodiment, the activation information is scrambled, and the processor is configured to perform processes to descramble the activation information.

An embodiment of the method of the invention includes sending a registration request including identifying information, receiving an activation record, extracting activation information from the activation record, generating an activation confirmation from the extracted activation information, and sending the activation confirmation.

In a further embodiment of the method of the invention, sending a registration request including identification information further includes transmitting the telephone number of a mobile phone to a registration server.

In another embodiment of the method of the invention, extracting activation information from an activation record further includes decrypting information within the activation record and descrambling decrypted information in accordance with a predetermined sequence of processes.

In a still further embodiment of the method of the invention, the activation information includes a base encryption key and a user encryption key and a random value.

In still another embodiment of the method of the invention, the activation information includes multiple base encryption keys.

A yet further embodiment of the method of the invention includes receiving a content key from content provider, receiving playback parameters from a content provider, locating a user key and a base key associated with a device, encrypting the playback parameters using the base key, encrypting the content key using the user key, and providing a playback certification including the encrypted playback parameters and the encrypted content key.

Yet another embodiment of the method of the invention also includes locating multiple user keys and multiple base keys associated with a device, forming a playback parameters table, where each entry in the table includes the playback parameters encrypted using a different base key, forming a content key table, where each entry in the table includes a copy of the content key encrypted using a different user key and providing a playback certification including the playback parameters table and the content key table.

A further embodiment again of the method of the invention includes generating a deregistration request using activation information known to a server and a device, transmitting the deregistration request to the server, and receiving acknowledgement of the deregistration request.

Another embodiment again of the method of the invention includes generating multiple domain keys associated with a particular class of device, providing each of the domain keys to each device in the class of device, storing the multiple domain keys on a registration server, using each of the multiple domain keys to encrypt information to generate a playback certification, which enables each device in the class of device to access technically protected content, deleting one of the stored multiple domain keys, and using the remaining multiple domain keys to encrypt information to generate a playback certification.

A further additional embodiment of the invention includes generating multiple user keys associated with a particular device, storing the multiple user keys on a registration server, providing one of the user keys to the device, using each of the multiple user keys to encrypt information to generate a playback certification, which enables the device to access technically protected content, deleting one of the stored user keys, providing another of the user keys to the device, and using each of the remaining multiple user keys to encrypt information to generate a playback certification.

DETAILED DESCRIPTION OF THE INVENTION

Figure 1:
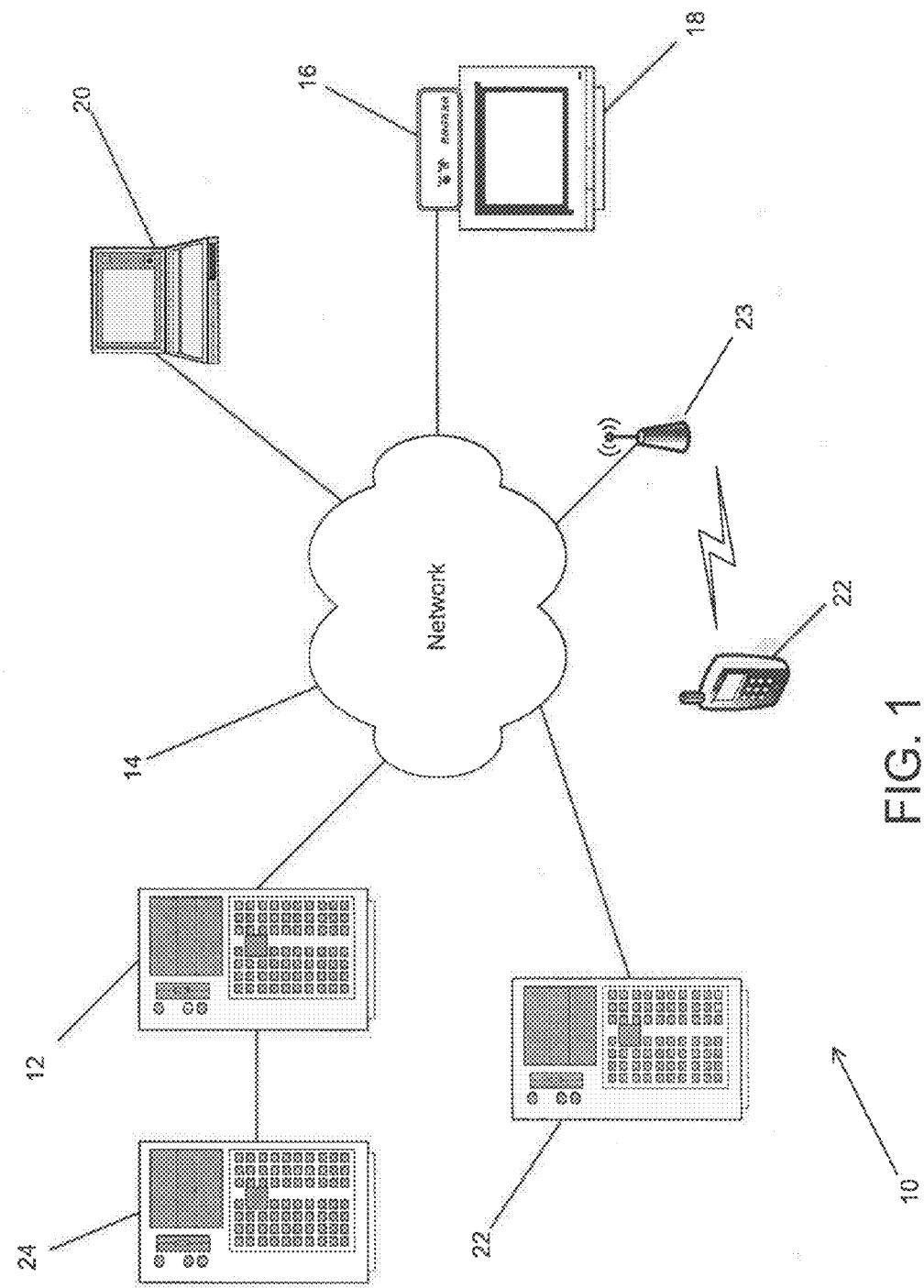
FIG. 1 is a schematic diagram showing a federated system in accordance with an embodiment of the invention.

Turning now to the drawings, a federated system for establishing playback parameters for digital content that includes trusted systems is illustrated. Playback parameters define the actions that a playback device is able to perform with respect to a particular piece of digital content. Playback parameters can govern the playing, copying and/or distribution of the content. The system is referred to as federated, because no single system possesses all of the information required to set the playback parameters for a piece of content. In a number of embodiments, content providers can use trusted systems which contain secrets the content providers cannot access to issue playback certifications. The playback certifications that can be used to provide technical protection to digital content such as audio/video presentations, data, games, documents and programs. In many embodiments, the playback certifications dictate how the content can be viewed, edited and/or otherwise accessed by authorized users using authorized equipment. In many instances, the playback certifications can prevent users from removing commercials from an audio/video presentation. In addition, the technical protection incorporated in the playback certifications enables the creation of content distribution systems in accordance with the present invention that are resistant to spoofing and other attempted fraudulent activity. Where multiple classes of devices are supported by a federated system, a single piece of content can be issued with multiple playback certifications. Each of the playback certifications can be customized to a particular class of devices and govern the manner in which that class of device can playback the content.

In several embodiments, the federated system includes a registration system that registers playback devices. The registration process involves establishing one or more "user encryption keys" that are known only to the playback device and the registration entity. The "user encryption keys" can be unique to a device or user or the same encryption keys can be placed in a limited set of devices. Once registered, a playback device can request content from a content provider within the federated system. The content provider can encrypt the content using one or more encryption keys that are only known to the content provider. The content provider then provides the encryption keys used to encrypt the content to a trusted system provided by the registration entity. The trusted system then encrypts copies of the content provider's encryption keys using one or more of a user's "user encryption keys". In many embodiments, the trusted system encrypts additional information using one or more base keys that can be known by all playback devices, a predetermined class of playback devices or specified groups of playback devices depending upon the structure of the federated system. In instances where a base key is issued with respect to a particular class of devices or a domain, the base key can be referred to as a domain key.

Although many of the embodiments described herein refer to combinations of encryption keys such as base keys, content keys, user keys and frame keys, any of a variety of combinations of keys provided by different entities can be used in a federated system in accordance with embodiments of the invention. In addition, no single technique need be used to register playback devices, provide playback devices with playback certifications and suspend playback devices. Federated systems in accordance with a number of embodiments of the invention provide a single registration entity capable of performing discrete processes for registering and suspending a variety of classes of devices, where each process utilizes the capabilities of each class of device.

An embodiment of a federated system 10 is shown in FIG. 1. The system includes a content server 12 that is connected to a number of playback devices by a network 14. In the illustrated embodiment, three playback devices are shown. The first is a consumer electronics device 16 that is connected to a rendering device 18 such as a television. The second playback device is a computer 20 that is appropriately configured using software. The third is a mobile phone handset 22 that is connected to the network 14 via a wireless link 23. Other devices that can render audio and/or video can also be playback devices in accordance with embodiments of the present invention.

Additional elements of the federated system 10 are a registration server 26 and a trusted system 28. The registration server 26 is connected to the network. Although the trusted system 24 is shown as being directly connected to the content server 12, trusted systems can also be connected to the network and shared by a number of content servers.

In the illustrated embodiment, the registration server 26 can be used to register playback devices within the federated system. A playback device can register to participate within the federated system directly with the registration server or indirectly, for example via a content server that completes the registration by forwarding the registration information to the registration server. Once registered, the playback devices can request content from the content server 12. The content server 12 can provide the playback device with encrypted content that includes one or more playback certifications depending upon the number of classes of devices and/or the versions of playback certifications supported by legacy devices within the federated system. In several embodiments, the playback device uses one or more user encryption keys that the registration server associated with the playback device during registration, one or more base keys inherent to a class of devices and the playback certification to access the content. In a number of embodiments, the content server 12 does not possess, in the clear (i.e., in an unencrypted form), the encryption keys used to encrypt the content. The trusted system 24 does, however, possess the ability to obtain the encryption keys in the clear. Therefore, the content server 12 can provide information requiring encryption to the trusted system 24 for encryption and the trusted system 24 can generate any required playback certifications using the playback device's encryption keys (if required).

As discussed above, playback devices in accordance with the present invention can take a number of different forms. Playback devices can be consumer electronics devices, including stand-alone devices or networked devices that are connected via copper cable, fiber optic cable, wireless connection or other networking technologies. In addition, playback devices can be software that executes on general purpose network computers, such as PCs, servers, workstations and embedded systems. Furthermore, playback devices can take the form of digital electronics cards or printed circuit boards. Moreover, all of the functionality of a playback device can be implemented in an application specific integrated circuit, a field programmable gate array, firmware, software or other electronic device.

The trusted system 24 is essentially a black box that responds to instructions in known ways without revealing any information about the processes it is performing. In a number of embodiments, the trusted systems are opaque in the sense that the base key(s) are stored inside the trusted system and the process of generating a playback certification cannot be ascertained by observation of the trusted system. Trusted systems can be implemented in a number of ways. Several embodiments of trusted systems are implemented using secure software that is tamper resistant. Such software includes software that employs code obfuscation, self modifying code, encrypted code segments, anti-debugging, code integrity, hardware monitoring, split-keys, and/or kernel/driver authentication. In many embodiments, secure hardware is used to implement trusted systems. Examples of secure hardware include programmable hardware security modules such as those that comply with the Federal Information Processing Standard (FIPS) Publication 140-2 specified by the U.S. National Institute of Standards and Technology and the Communications Security Establishment of the Government of Canada, trusted computing hardware or other types of hardware that are tamper resistant. Examples of such hardware include hardware securely encased in such a way that the hardware is rendered inoperable and/or important information is erased from memory in the event that the encasing is opened. In many embodiments, trusted systems use system-level security including firewalls, network and host-based intrusion detection, system hardening, two-form authentication, physical security (such as secure data centers, security cameras, locked computer racks, physical access control, access logs, etc.) and cascaded network architectures.

An important element of the federated systems described above is the ability to trust in the security of the trusted systems. In many embodiments, the trusted systems are commissioned by the registration entity. The commissioning process typically involves configuring the trusted system and providing the trusted system with information concerning the functions that the trusted system is authorized to perform. For example, a trusted system may be authorized to register playback devices, generate persistent, user-bound playback certifications but may prohibit the generation of base or general playback certifications. Configuration is typically performed by providing an appropriately formatted message to the trusted system.

In many embodiments, the trusted systems generate an audit log of all transactions/operations performed by the secure system. Each entry in the log can be numbered in a monotonically increasing sequence and the log signed using a private key enabling the detection of attempts to alter or remove entries on a log. Content providers can use the log to help detect fraudulent activity. For example, if the number of playback certifications that have been generated exceeds the number that were sold, then it is possible that someone has broken into the content provider's customer database, stolen content and/or user encryption keys and has been using the trusted system to generate unauthorized playback certifications. In addition, the security of the trusted system can be further increased by using different base keys for different device domains and including multiple redundant base keys per device. These measures enable key retirement, revocation and rotation.

In many embodiments, the entity that commissions the trusted systems (typically the entity that registers devices) can exercise limited control over use of a trusted system. In several embodiments, the trusted system can be configured to automatically expire if not updated periodically. Such updates can be used to change the trusted system's entitlements including performing key revocation and redundant key rotations.

Figure 2:
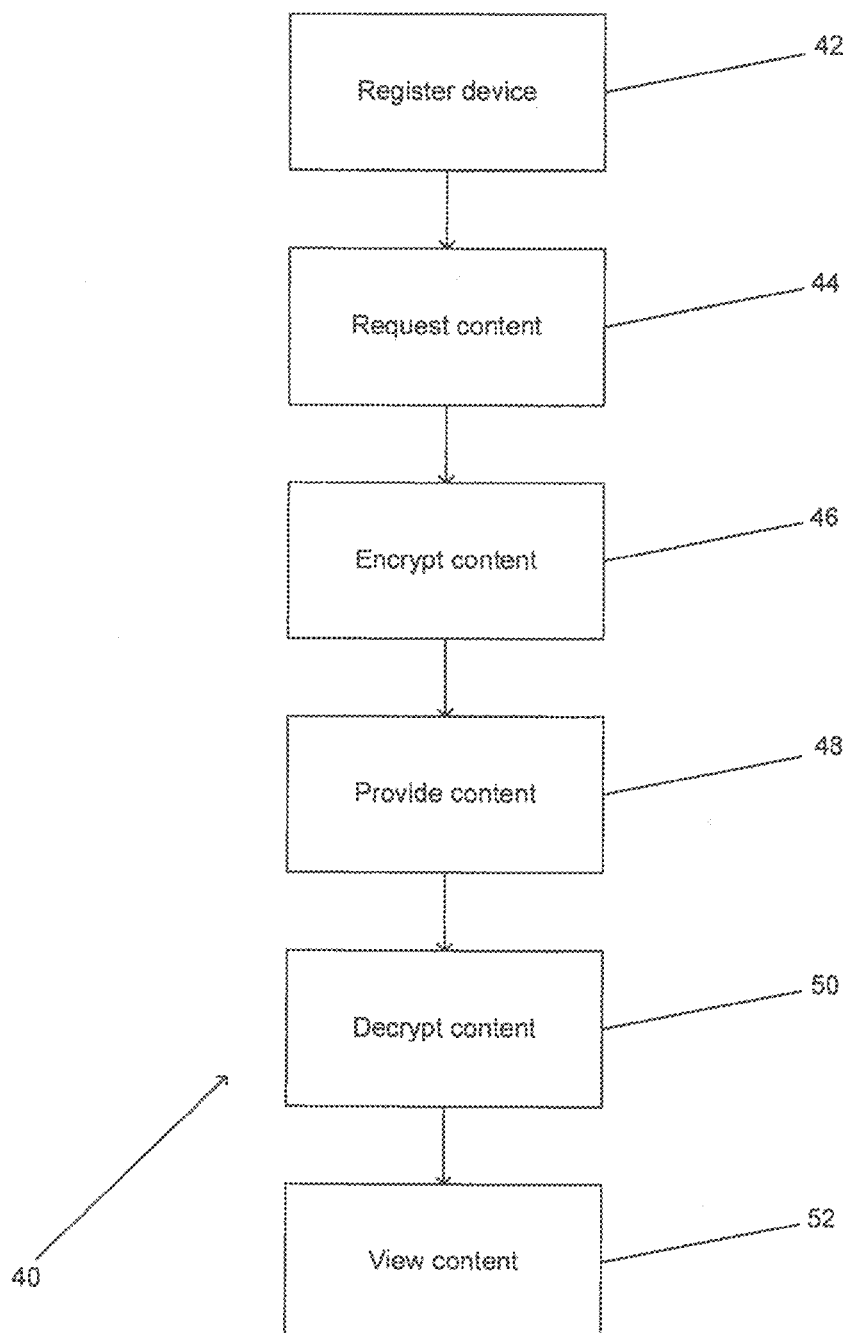
FIG. 2 is a flow chart showing a process for viewing a specific piece of content in accordance with an embodiment of the invention.

A process in accordance with the present invention for obtaining content is shown in FIG. 2. The process 40 includes registering (42) a playback device. Following registration, the playback device can request (44) content. Prior to the content being provided (48) to the playback device, the content is encrypted. The actual content encryption can be done offline, but the final protection for the keys is typically done at the time the content is requested. Upon receipt of the content by the playback device, the content is decrypted (50) and the content is then available for viewing (52).

As discussed above the registration of a playback device involves the playback device being registered with a registration server. In many embodiments, the user device is provided with one or more "user_ids" (i.e., a user identification) and one or more unique "user encryption keys". Processes for registering playback devices, such as consumer electronics devices, are described in U.S. patent application Ser. No. 10/895,355 filed Jul. 21, 2004 and entitled Optimized Secure Media Playback Control. The disclosure of U.S. patent application Ser. No. 10/895,355 is incorporated herein by reference in its entirety.

Extending on the Optimized Secure Media Playback Control registration process described in U.S. patent application Ser. No. 10/895,355 is a registration process that can be used to register devices capable of interactive communication with a registration server, such as mobile phones, is shown in FIG.

2A. The process 54 includes determining (54*a*) whether the device has been "activated". In many embodiments, this determination involves determining whether the device includes has processed an activation record that has been provided by the server. The activation record includes information concerning the active "user_id" and "user encryption key" of the device and the active "base key" that has been assigned to the class of devices to which the device belongs. The activation record can be scrambled and encrypted using public key/private key encryption assigned to the device by the registration service and placed in the device during manufacturing. If the activation record has been processed, then the device can participate (54*b*) in the federated system, because it will have the user id and user encryption key and be considered activated, also known as "registered".

Figure 2A:
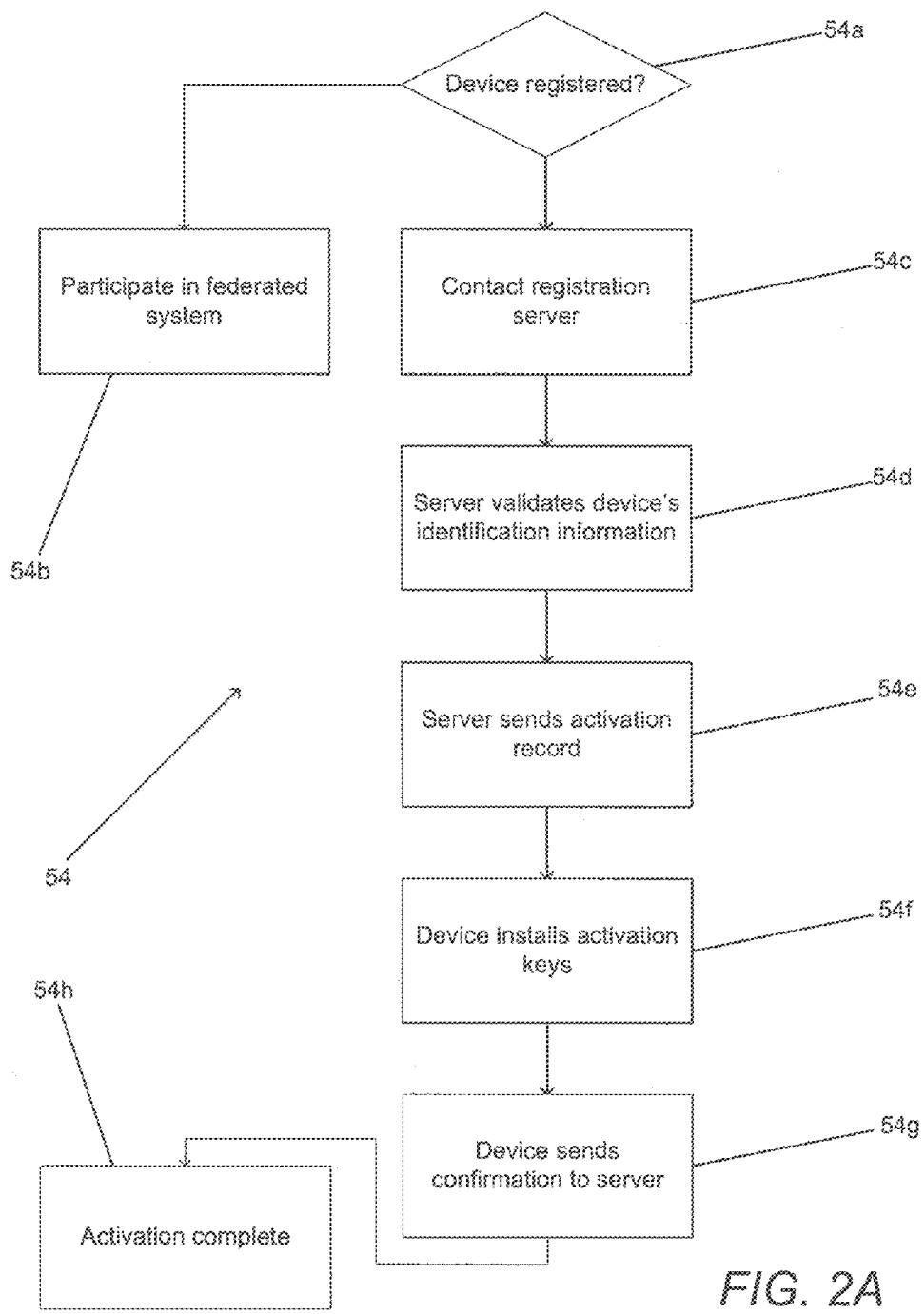
FIG. 2A is a flow chart showing a process for registering a device capable of communicating with a registration server.

When the device has not been activated, the device contacts (54*c*) the registration server to commence registration. The device provides information including identifying information such as a phone number or a user name and password to the registration server. The server validates (54*d*) the identifying information and sends (54*e*) an activation record to the device. The device performs the necessary decryption and/or descrambling processes required to obtain the various activation keys and install (54*f*) them. Once the installation is complete, the device sends (54*g*) an activation confirmation code to the server and the server authenticates (54*h*) the activation code to complete the activation. Although the process shown in FIG. 2A contemplates direct communication between the device and the registration server. The initial communication can occur between a third device such as a networked computer and the registration server. Once the registration is initiated using the networked computer, the registration server can send the activation record to either the computer or the device. If the activation record is sent to the computer, the activation record can then be transferred to the device and used to complete the activation of the device. The activation of the device can be completed by the user entering the human readable codes into a user interface for the registration service.

Figure 3:
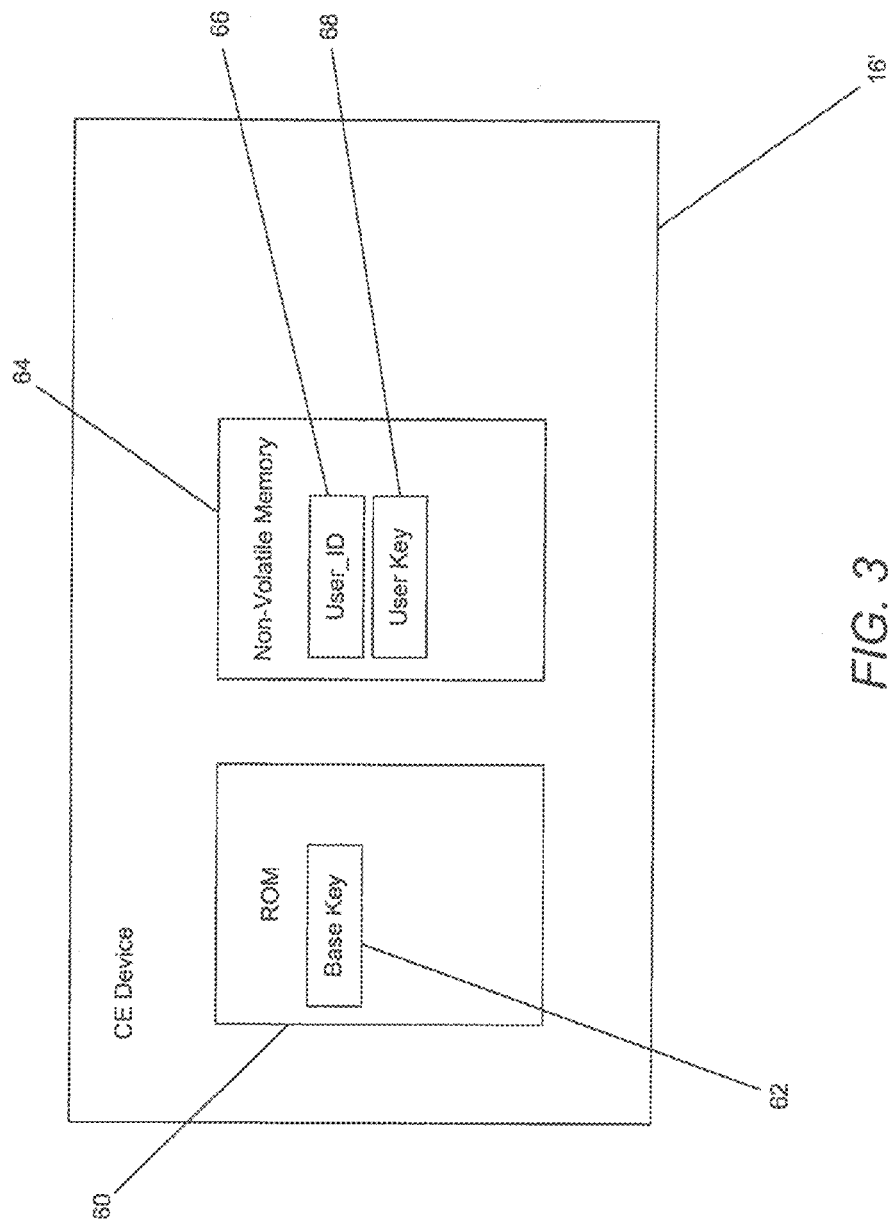
FIG. 3 is a schematic diagram of a consumer electronics device including ROM and non-volatile memory in accordance with an embodiment of the invention.

A registered consumer electronics device in accordance with an embodiment of the present invention is shown in FIG. 3. The registered consumer electronics device 16' includes ROM 60 that contains a "base encryption key" 62. The "base encryption key" 62 is an encryption key that enables the playback device to be registered within the federated system. In addition to the ROM 60, the consumer electronics device includes a non-volatile memory 64 in which one or more "user_ids" 66 and one or more "user encryption keys" 68 are stored. As discussed above, the "user_id(s)" 66 and "user encryption key(s)" 68 are obtained from a registration server in many embodiments of the present invention.

Although the consumer electronics device shown in FIG. 3 only shows a single "base encryption key" 62 in its ROM, multiple base encryption keys that are each identifiable using a unique identifier can be stored in the ROM. In addition, the encryption keys need not necessarily be stored in the clear. Additional encryption keys and/or scrambling processes can be provided within a playback device that can be used to decrypt the keys for use.

In many embodiments, playback devices support multiple device registrations (i.e., registered to multiple users at a time). In systems where a user has a limit on the number of devices that can be registered, then each user's registration of the device counts against that user's device limit.

Figure 4:
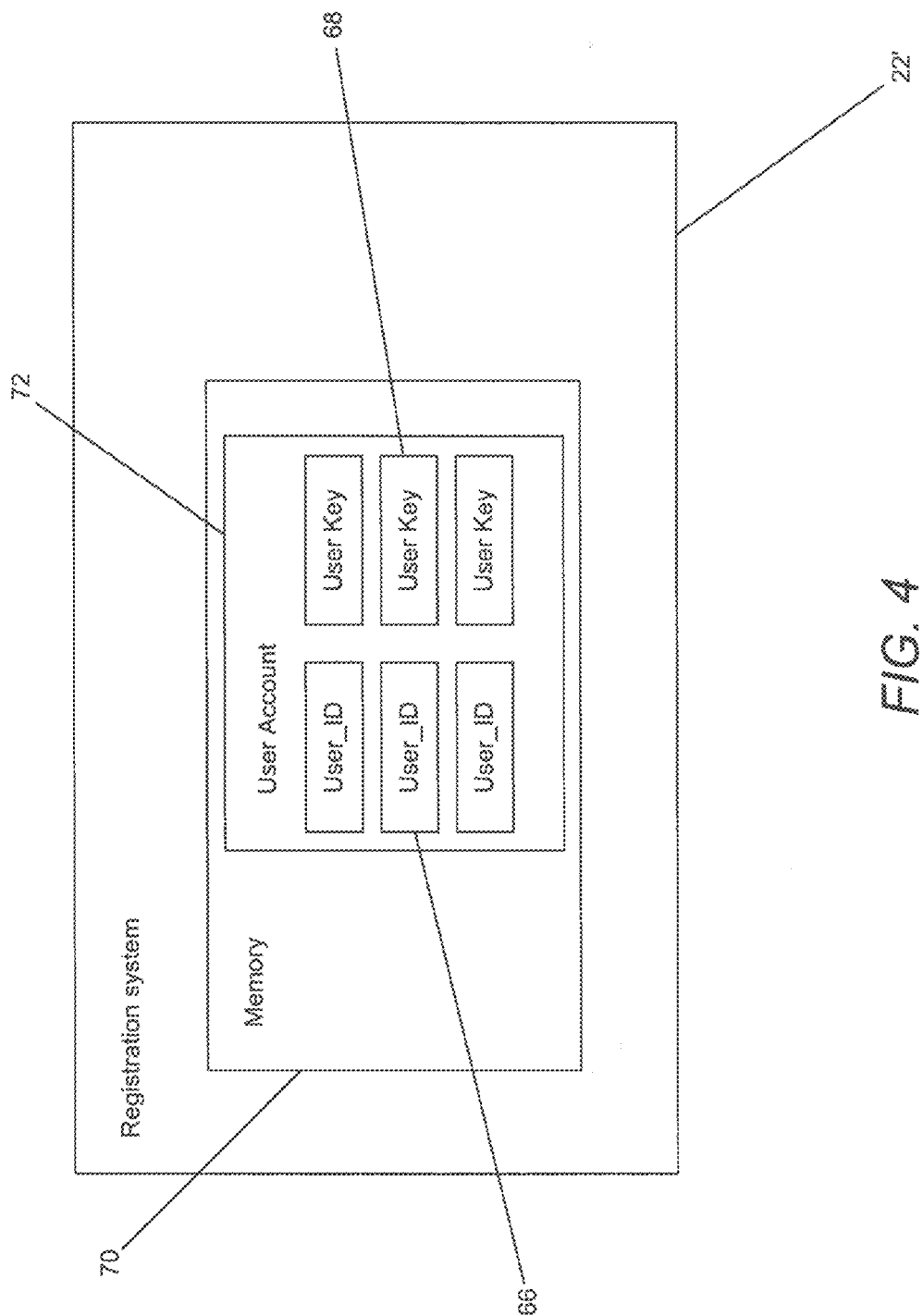
FIG. 4 is a schematic diagram of a registration server in accordance with an embodiment of the invention.

When a registered playback device, similar to the playback device shown in FIG. 3 is registered, the registration server creates a user account containing information about the registered device. A registration server in accordance with an embodiment of the present invention is shown in FIG. 4. The registration server 22' includes a memory in which user accounts 72 are stored. In many embodiments, the user accounts contain the "user_id(s)" 66 and "user encryption key(s)" for a registered device. When a user account includes multiple encryption keys, each "user encryption keys" can be identified using a "user_key_id" that is also stored in the user account. In a number of embodiments, the registration server maintains additional information concerning a user such as other devices registered by the user. In many embodiments, the user can define groups of devices between which the user desires the ability to share content. For example, the user can define a "premium group", a "syndication group" and a "general group". Each group can give a different number of device registrations (e.g., "premium group" could include up to 3 devices while "general group" could give up to 10 devices). In embodiments where groups are supported, the registration server can issue a bit vector to a device requesting registration that indicates the groups to which the device belongs. The bit vector can enable content providers to issue playback certifications that enable content to be played on a group of devices or on specific devices only.

Although the above discussion refers to the registration server as a separate device, the registration server can be combined with other devices. In many embodiments, a trusted system also performs the functions of a registration server.

When a device is registered, the device is then able to request content from a content provider. In federated systems in accordance with a number of embodiments of the invention where only one class of device exists, the content server can issue encrypted content to a user with a single playback certification. In other embodiments that support multiple classes of devices, then the content server can issue encrypted content to a user with multiple playback certifications. Each playback certification contains the information required by a particular class of devices to play back the content. In this way, the playback requirements of different classes of device can be accommodated.

Figure 5:
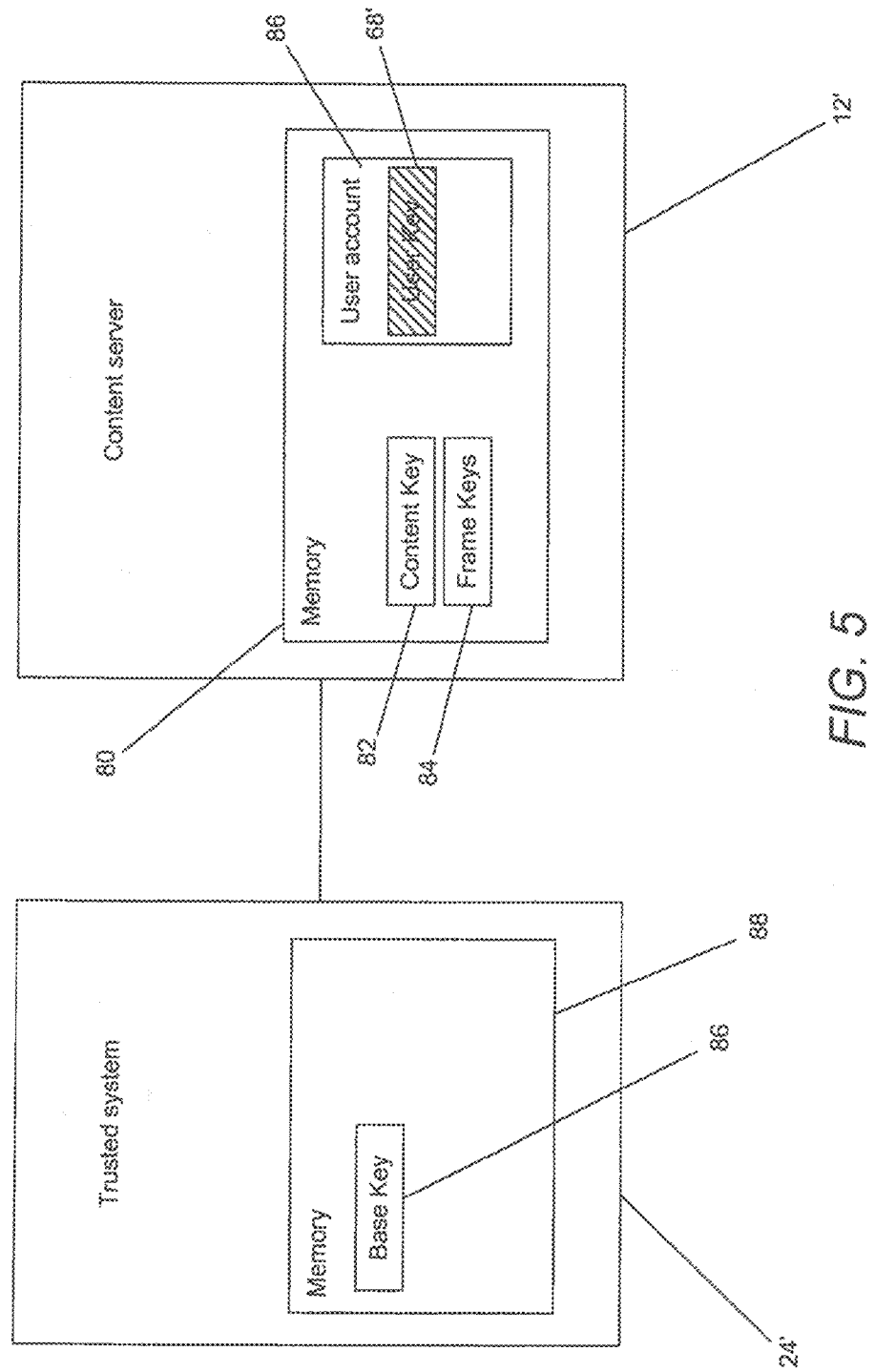
FIG. 5 is a schematic diagram of a content distribution system connected to a trusted system in accordance with an embodiment of the invention.

An embodiment of a content server connected to a trusted system in accordance with an embodiment of the present invention is shown in FIG. 5. The content server 12' includes memory 80 that contains a "content encryption key" and "frame encryption keys". The memory 80 also includes a user account 86 that stores information about the user requesting the content. In a number of embodiments the user account contains an encrypted form of one or more "user encryption keys" 68'. In the illustrated embodiment, the memory 80 contains a "content encryption key" 82 and a table of "frame encryption keys" 84.

The table of "frame encryption keys" 84 can be used to encrypt frames of a video sequence. Processes for encrypting video sequences using frame encryption keys are discussed in U.S. patent application Ser. No. 10/615,898 filed Jul. 8, 2003 and entitled "Method and System for Securing Compressed Digital Video". The disclosure of U.S. patent application Ser. No. 10/615,898 is incorporated herein by reference in its entirety.

The "content encryption key" 82 and the "frame encryption keys" 84 are generated by the content provider. These keys are provided to the trusted system as part of the generation of the playback certification. In many embodiments, maintaining the "content encryption key" 82 and the "frame encryption keys" 84 within the content provider's system is desirable to limit the potential for the keys to become publicly known. In other embodiments having lower security concerns, the content provider can provide the "content encryption key" 82 and the "frame encryption keys" 84 to another entity to perform the encryption of the content. In a number of embodiments, the content provider provides a video sequence for encryption to the trusted system and the trusted system returns the encrypted content. In several embodiments, the content provider provides the content to a 3rd party system that encrypts the content using any suitable content encryption technique and returns the encrypted content to the content provider.

In the illustrated embodiment, the content server 12' includes user accounts 86 and the user accounts contain encrypted "user encryption keys" 68'. An advantage of maintaining the user account at the content server is that no communication with devices outside of the content provider's system is required to issue content. Where communication with other devices is acceptable, the encrypted "user encryption keys" 68' can be provided by the playback device and the encrypted "user encryption key" 68' encrypted using either the "base encryption keys" or other encryption keys. In other embodiments, the content server 12' requests that the registration server provide the encrypted "user encryption keys" 68' and the encrypted "user encryption keys" 68' are encrypted using the "base encryption keys" or other encryption keys.

In the illustrated embodiment, the trusted system 24' also includes a memory 86 that contains a set of keys that the trusted system 24' can use to issue playback certifications. These keys includes the active base key(s) 86 that are used by various classes of device. The set of keys can also include inactive base keys in anticipation of key retirements. As discussed above, the content server 12' does not see in the clear encryption keys used by the trusted system 24' to generate playback certifications.

The keys possessed by the content server and the trusted system can be used to encrypt content for distribution to a user. The content can be a video sequence, an audio sequence, a still photograph or a file. In embodiments, where content other than a video sequence is encrypted the keys described as the "frame encryption keys" are used to encrypt at least a portion of the content.

Figure 6:
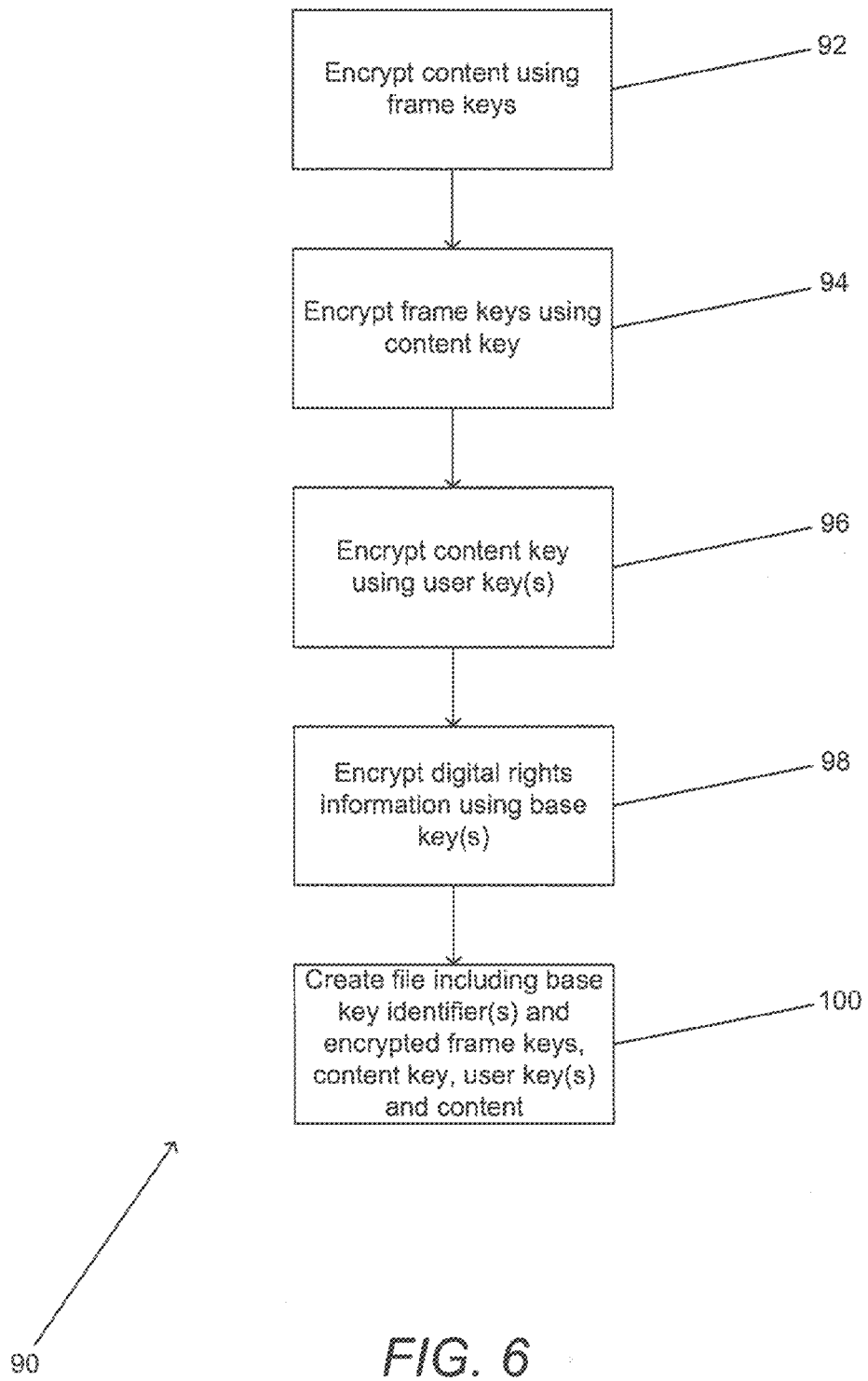
FIG. 6 is a flow diagram showing a process for encrypting content in accordance with an embodiment of the invention.

A process in accordance with the present invention for encrypting content and generating a playback certification is shown in FIG. 6. The process 90 includes encrypting (92) the content using "frame encryption keys". The "frame encryption keys" are then encrypted (94) using the "content encryption keys". The "content encryption key" is then encrypted (96) using the one or more "user encryption key(s)", which enables for "user encryption key" revocation or retirement (see discussion below) and then digital rights specified with respect to the content by the content provider are then encrypted (98) using one or more "base encryption keys" appropriate to the class of device for which the playback certification is being issued. Again, the use of multiple "base encryption keys" allows for "base encryption key" revocation or retirement (see discussion below). The resulting bundle of variously encrypted pieces of information are used to create the playback certification. The playback certification is incorporated (100) with the encrypted content to create a file for distribution to the user that requested the content. In embodiments where more than one base key is used, a base key identifier is also included in the file. In embodiments where multiple playback certifications are provided, each playback certification can include information identifying the type of playback certification, such as a version number.

As discussed above, the distribution of the various encryption keys throughout the system varies. In many embodiments, the content, the rights granted and the "user_id" are provided to a trusted system and the trusted system returns an encrypted file including a playback certification for distribution to a user. In other embodiments, the content provider sends the secure system simply the information requiring encryption by the one or more "user encryption keys" and one or more "base encryption keys". In other embodiments, other combinations of keys provided by different entities are used to secure information necessary to access technically protected content. As discussed above, the technique used to technically protect the content can vary depending upon the security needs of entities within the federated system.

Figure 7:
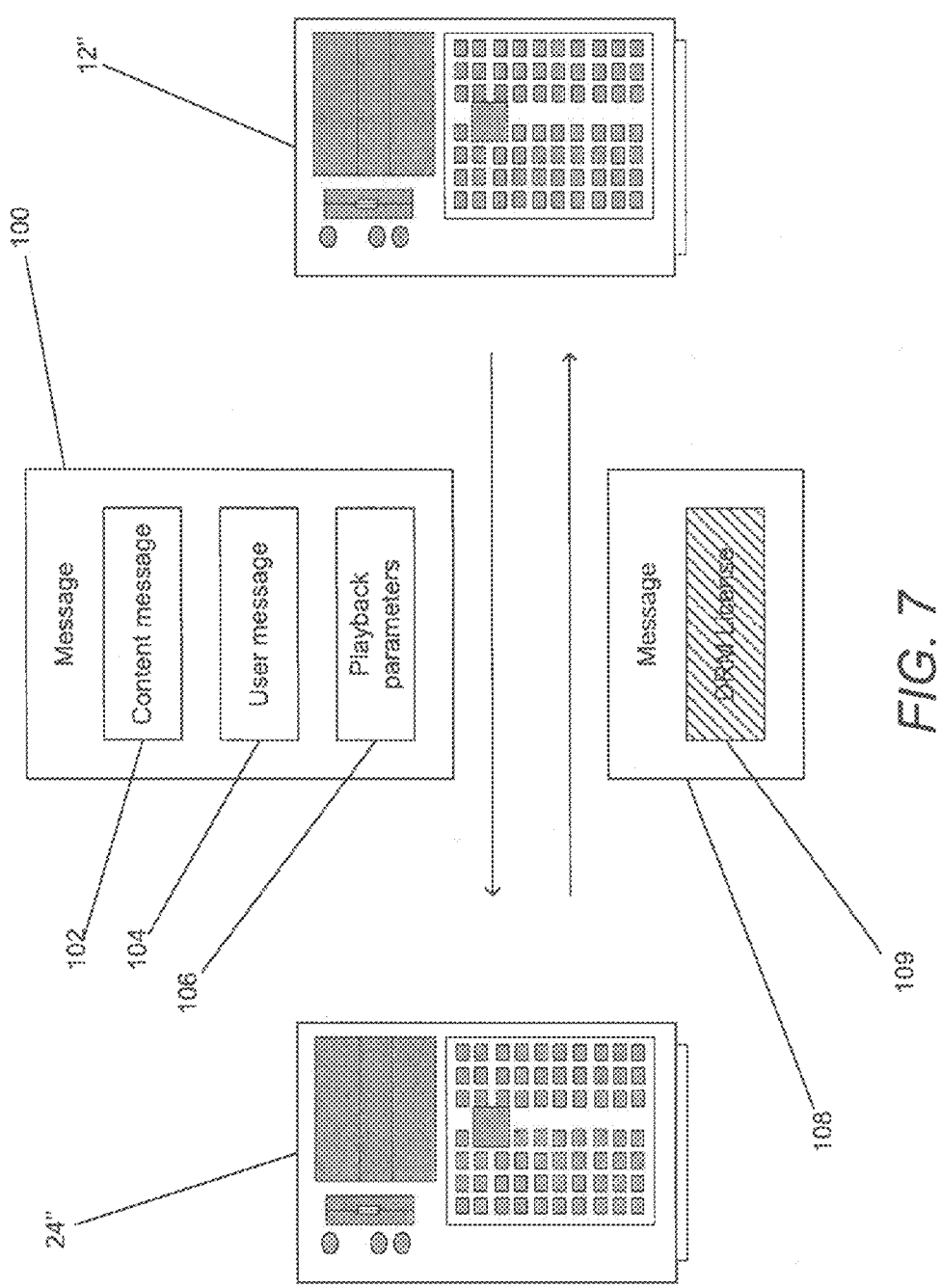
FIG. 7 is a schematic diagram showing an exchange of messages between a content server and a trusted system in accordance with an embodiment of the invention.

A server providing a trusted system with information for the generation of one or more playback certifications in accordance with an embodiment of the present invention is shown in FIG. 7. The server provides the trusted system with a message 100 that includes a content message 102, a user message 104 and instructions 106 concerning the type(s) of playback certification to generate. The trusted system receives the message 100 and replies with a message 108 that contains the playback certification(s) 109. The content message 102 contains one or more content keys issued by the content provider with respect to a specific piece of content and access control that governs the operations that can be performed by a trusted system with respect to that piece of content (e.g., whether the trusted system is allowed to generate a playback certification, the types of playback certifications that are allowed for that content and/or whether the content is bound to a user or bound to a media). The user message 104 contains the "user encryption keys" for the specific user that is requesting the content as well as access control governing what operations the user authorizes the trusted system to perform (e.g., limiting slot-based playback certifications to specific slots). The instructions 106 concerning the playback parameters of the playback certification being issued specify the manner in which a user can access the content.

The rights that can be granted by a content provider to users can be customized by the content provider and are typically based upon the content restrictions supported by playback devices registered within the federated system. For example, a content provider can provide general access to any registered device (a variation where no "user encryption key" or other form of restriction to a specific user is used in the generation of the playback certification).

Another type of playback certification is a persistent certification, where the content provider provides the user with rights and the content can be copied with the same playback certification(s). Where multiple playback certifications are provided to support multiple classes of device, each of the playback certifications is copied.

A slot based rental is a type of playback certification where content is certified for playback on a rental slot. For example, a user with eight slots can have up to eight rentals active at a time. When the ninth rental is certified, then the certification for one of the previous eight rentals automatically expires (i.e., the user loses the ability to access the content). With slot based rentals, the content can be copied with the same playback certification(s).

A count-based rental is a playback certification that enables the content to be used a fixed number of times, after which it expires. The content can be copied with the same playback certification(s). A time-expiration rental is a playback certification that grants access to content for a fixed period of time. The time period can be absolute (e.g., Jun. 2, 2006) or relative to the first time the content is used (e.g., 24-hour rental).

Another type of playback certification is fixed media copy protection. A fixed media copy protection playback certification is encrypted without using a "user encryption key" (i.e., is not tied to a user) and is bound to its original fixed media (e.g., flash media, optical disc, secure flash drive). Content assigned a fixed media copy protection playback certification cannot be copied. A recordable media copy protection certification is another type of playback certification that is technically protected without using a "user encryption key". The content may be initially downloaded and stored onto recordable media, but once recorded cannot be copied or re-recorded. Variations of this playback certification can enable a predetermined number of copies to be made securely from the original, progenitor copy. In addition to the above certifications, content can be protected using any of the above certifications and then sold via a subscription service.

In a number of embodiments, the content includes a playback certification that can be provided with the content as a guest certification. The guest certification can be used to enable extremely limited play back by a user in response to the recommendation of the content by another user. For example, the guest certification may enable a user receiving the content to view the content for a short period of time or a single time. In other embodiments, a user can enjoy a subscription and be entitled to playback all or predetermined subsets of available content while the subscription is in effect. In systems where subscriptions are supported, content can have an additional subscription playback certification associated with the content that governs the subscribers that can access the content.

As discussed above, many embodiments of the invention associate more than one playback certification with a single piece of content. When more than one playback certification is associated with a piece of content, a playback device can search for and use any playback certification that enables the content to be accessed by the playback device. Each of the playback certifications can specify different playback parameters, enable access to different users and/or enable access to different device groups. In a number of embodiments, a user can receive content with a particular type of certification (e.g. guest) and can obtain a different type of playback certification from the content provider. The user's device can then incorporate the different type of playback certification into the file that includes the content.

Figure 8:
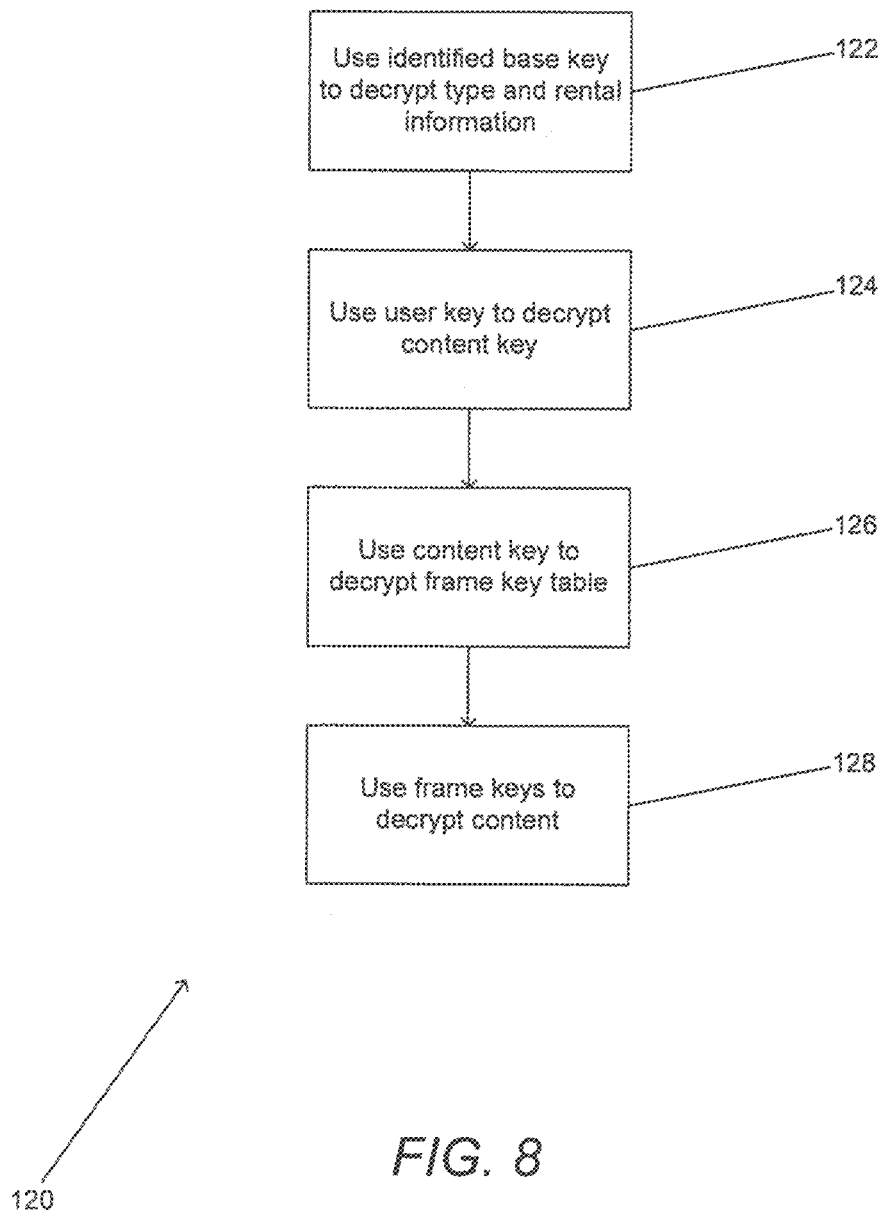
FIG. 8 is a flow chart showing a process for play back of technically protected content in accordance with an embodiment of the invention.
Figures 9A, 9B:
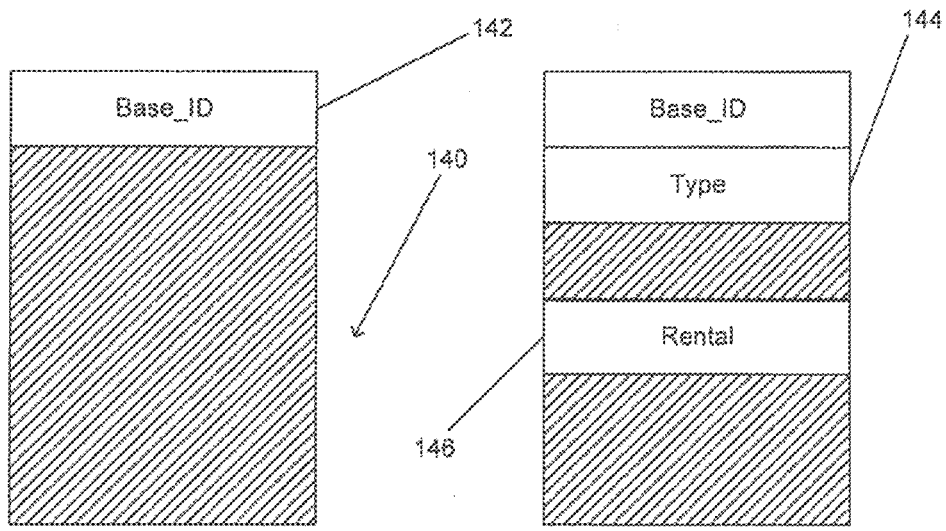
FIGS. 9A-9D are schematic representations of a playback certification showing portions of the playback certification that are encrypted at various stages during decryption of the playback certification in accordance with an embodiment of the present invention.
Figures 9C, 9D:
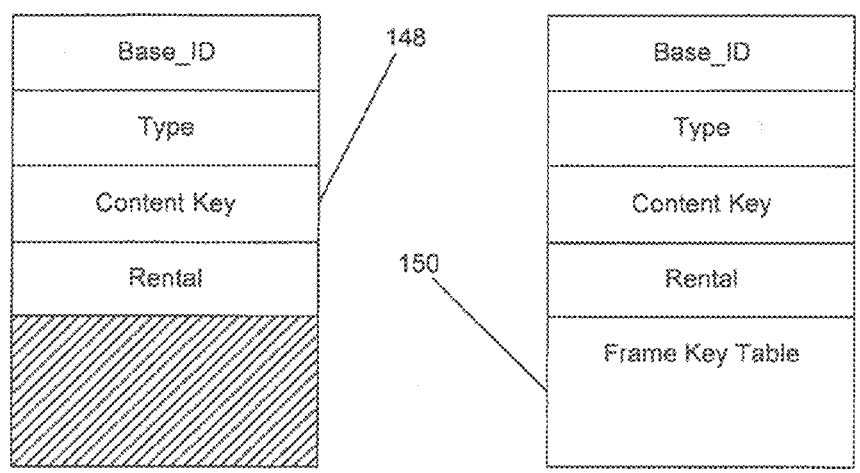

Once a file has been formed including the technically protected content and a playback certification, the file can be provided to a playback device. A process for accessing the content for playback in accordance with an embodiment of the present invention is shown in FIG. 8. The process 120 includes identifying (122) the active "base encryption key" for the particular class of device that is attempting to access the content, which can be used to access information concerning the type of playback parameters supported by the playback certification. The active "user encryption key" is then used to decrypt (124) the version of the "content encryption key" that was encrypted by the active "user encryption key". The "content encryption key" is then used to decrypt (126) the table of "frame encryption keys" used in the technical protections of the content. The table of "frame encryption keys" can then be used to play back (128) the content. Any decryption of the content typically occurs as the content is being viewed.

Information available in the clear during the decryption of a playback certification issued for devices that include a single base encryption key and a single user encryption key in accordance with an embodiment of the present invention is shown in FIGS. 9A-9D. The information within the playback certification 140 that is initially available in the clear 142 is the "Base_ID", which identifies the "base encryption key" used to encrypt information concerning the playback parameters supported by the playback certification. In the illustrated embodiment, the identified "base encryption key" is used to decrypt the "Type" 144 and the "Rental" 146 information. The "Type" 144 and the "Rental" 146 information specify the manner in which the user play back and otherwise deal with the content (e.g., "Rental" 146 can specify the rental slot occupied by the content). In other embodiments, the playback parameters are expressed using other combinations of information.

In embodiments where the "Type" information 144 indicates that general rights have been granted in the content (i.e., rights granted to all users), the "base encryption key" can also be used to decrypt the "content encryption key" 148. Otherwise, the "content encryption key" is decrypted using the "user encryption key" stored on the playback device. Once the "content encryption key" 148 is in the clear, it can be used to decrypt the table of "frame encryption keys". Once a playback device has the "frame encryption keys" the playback device has all of the information necessary to access the content and the "Type" 144 and the "Rental" 146 information regulate how the playback device accesses the content.

In the embodiment shown in FIGS. 9A-9D, the playback certification was issued with respect to devices that have a single "base encryption key" and a single "user encryption key". As discussed above, a single piece of content can have multiple playback certifications associated with it to accommodate various classes of device. Federated systems in accordance with many embodiments of the invention support the assignment of multiple "base encryption keys" to domains of devices and the assignment of multiple "user encryption keys" to a user account (typically only the active "user encryption key" is actually provided to the device at any given time). Therefore, playback certifications can be created that include multiple "base encryption keys" and multiple "user encryption keys". An advantage of using multiple keys is that over time individual keys can be retired or revoked and the remaining keys can still be used to access the content. In one embodiment, each of the "base encryption keys" is used to encrypt the same information. Similarly, each of the "user encryption keys" are used to encrypt the "content encryption key" 148. A table can be formed using each instance in which the information is encrypted using one of the multiple encryption keys. For example, playback certifications in accordance with many embodiments of the invention do not include a single "content encryption key" 148 encrypted using a "user encryption key" as is shown in FIGS. 9A-9D. Rather, the playback certifications include a table where each entry in the table is the "content encryption key" encrypted using a different "user encryption key". The same is also true with respect to tables of information encrypted with different "base encryption keys". The retirement and revocation of keys is discussed further below.

Figure 10A:
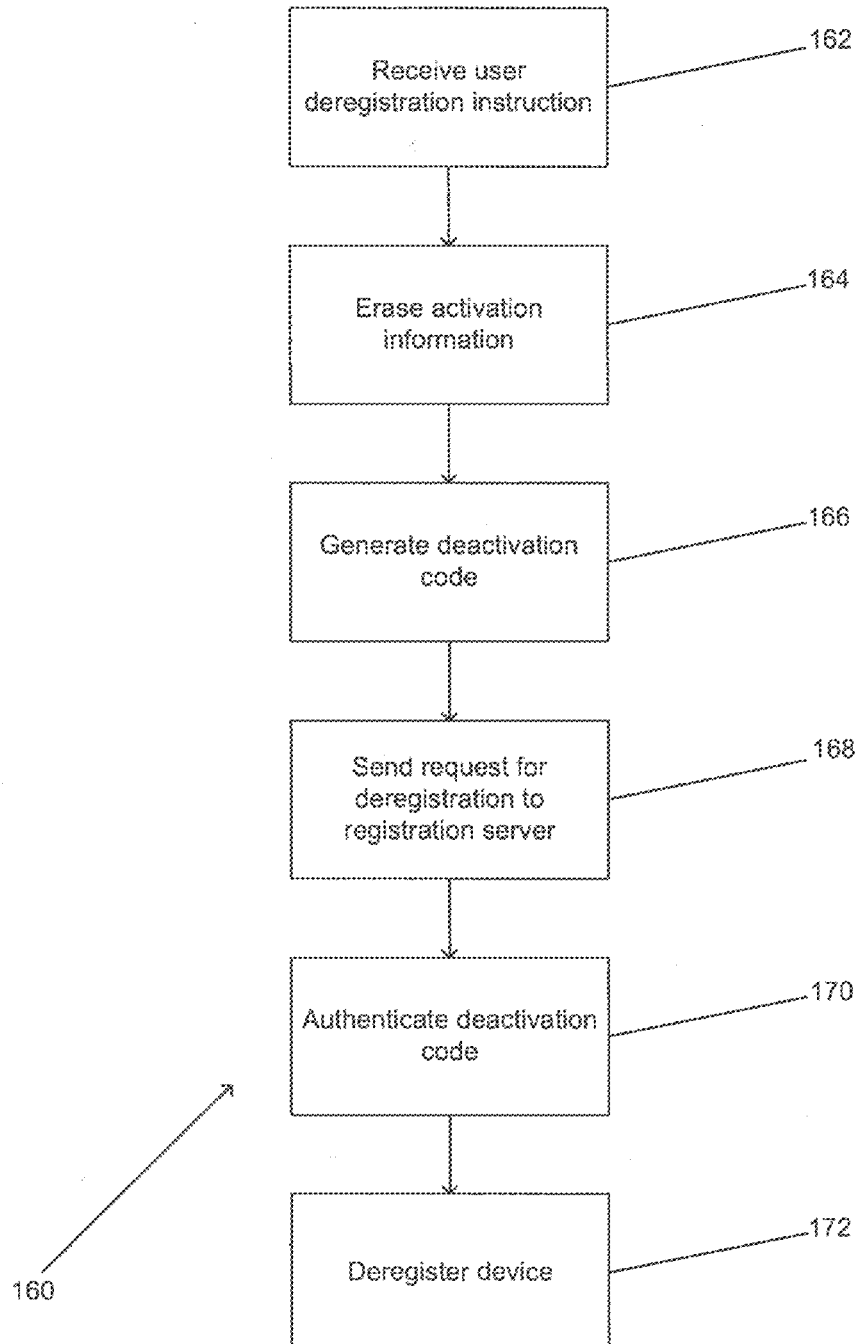
FIGS. 10A and 10B are flow charts showing processes for deregistering devices in accordance with embodiments of the invention.

Many embodiments of the invention enable users to deregister a device. For example, a user may wish to replace a device and register a new device. A process that a user can use to deregister a registered device is shown in FIG. 10A. The process 160 includes receiving (162) user instructions to deactivate the device. The user instruction typically includes a confirmation, which is due to the significance of the action being taken. The device then erases (164) the activation information (i.e., the activation record and/or installed activation keys) obtained during registration and generates (166) a deactivation code. The deactivation code can be generated using a predetermined processes that is seeded by at least some of the activation information. The deactivation code is transferred to the registration server as part of a deregistration request (168). The server authenticates (170) the deactivation code and then removes (172) the device from its register of activated devices. Although the process described above discusses the device itself communication the deactivation code to the registration server, the deactivation code can also be provided to the server via a third device such as a computer. In a number of embodiments, a deregistered device generates a deactivation code that the user provides to the server by manually entering the deactivation code via a web interface.

Figure 10B:
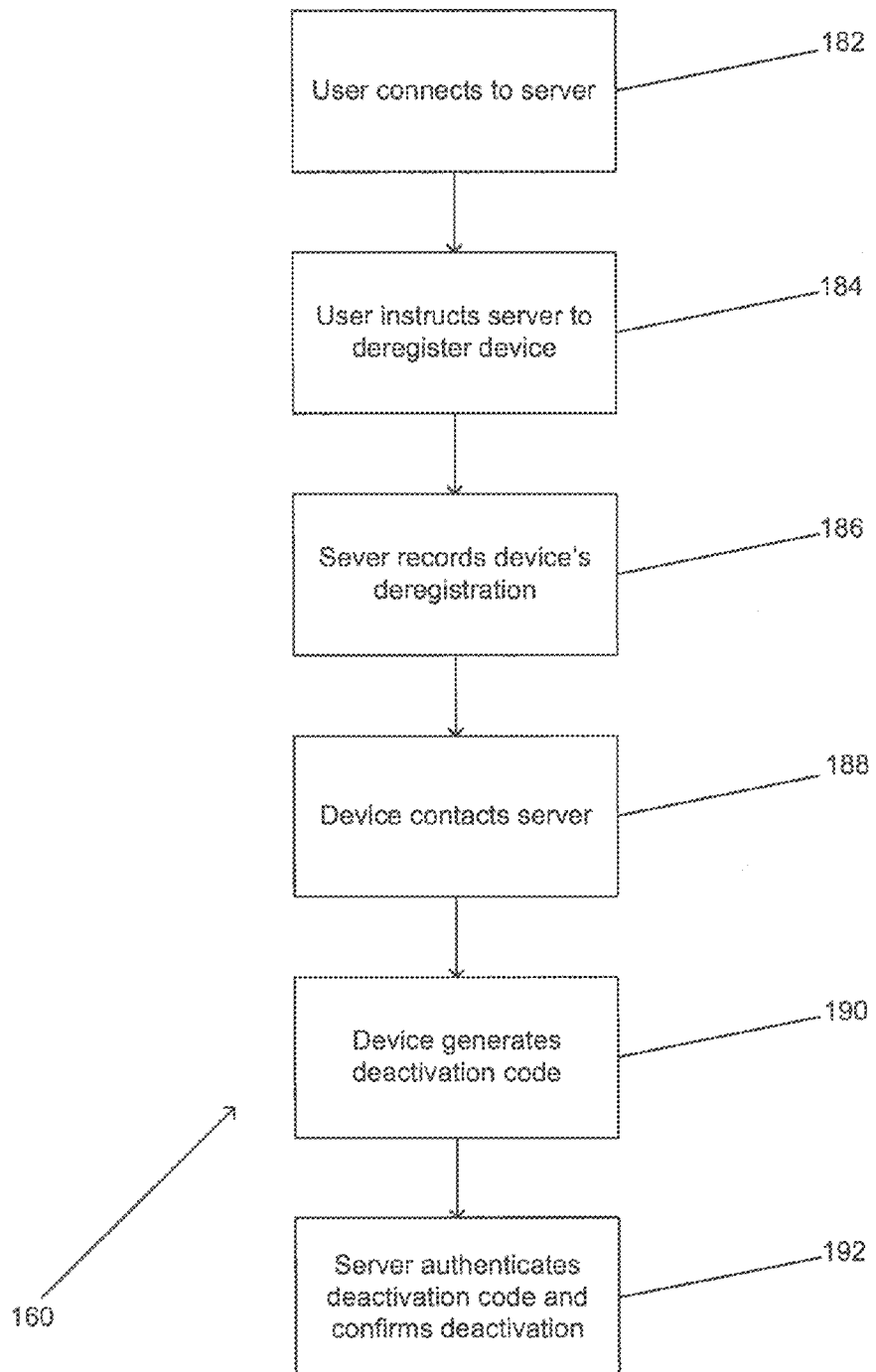

Another process for deregistering a device in accordance with an embodiment of the invention is shown in FIG. 10B. The process 160' is similar to the process 160 shown in FIG. 10A. The main difference is that the process 160' is a server initiated process. A user connects (180) to the server and instructs (182) the server to deactivate the device. The server records (184) that the device has been deactivated. The next time the device contacts (186) the server, the device learns of its deactivation and generates (188) a deactivation code that is sent (190) to the server. The server (192) authenticates the deactivation code to confirm that the device has been deactivated.

In addition to users deregistering devices, several embodiments of federated systems in accordance with the invention enable revocation of devices or "base encryption keys" associated with a class of device to prevent abuse of the system. Each type of revocation relies on the use of tables of information, where each entry in the table is the same piece of information (such as content key) encrypted using a different encryption key (see discussion above). A device's ability to access the information depends upon the particular encryption key the device possesses. When multiple different domains of devices exist, each domain can be issued a set of "base encryption keys". These keys can be protected using different scrambles for each system, but the underlying key material remains the same. For example the "Java Mobile Phone" domain can be defined to issue the same set of "base encryption keys" to every mobile phone that supports a Java operating system. However different models of receive different scrambles of the keys. If a key is compromised, it can be revoked by the registration server. As discussed above, "base encryption keys" are used to generate tables where each entry is a piece of information encrypted with a different "base encryption key". When a key is revoked, the key is no longer one of the keys used in the generation of the table. If the revoked key was extracted in a circumvention tool, that tool will no longer work.

Revocation of a specific device works in a similar fashion. In many embodiments, a device is provided with a single active "user encryption key" during registration. If the user's device is revoked, the user's active "user encryption key" will no longer be used as one of the encryption keys when forming a "content encryption key" table as part of a playback certification (see discussion above). If the revoked "user encryption key" was extracted in a circumvention tool, that tool will no longer work. The user's device must be registered again in order to obtain a new "user encryption key" that will enable the user to access any newly issued content. The new active "user encryption key" is one of the keys associated with the device by the registration server and is also one of the keys used by the federated system to encrypt the "content encryption key", when issuing a playback certification. Storing the full set of user keys at the registration server and providing user devices with a single "user encryption key" during registration facilitates key revocation. Content is protected for all "user encryption keys". If a "user encryption key" is leaked, then subsequent content will not be accessible with that key.

Key revocation can also be used to prevent abuses that may result from the discovery of a content provider's encryption keys. In many federated systems in accordance with embodiments of the invention, media key blocks are distributed to different content providers and a breach of security associated with a particular content provider's media key(s) can be minimized by deactivating that content provider's media key(s). Such a deactivation would not impact content provided by other content providers. Such a revocation would also not impact content previously provided to registered playback devices using the deactivated media key(s). The revocation would, however, prevent access to new content issued by the content distributor as the deactivated media key(s) would no longer provide access to the information within the new playback certifications required to play back the technically protected content.

While the above description contains many specific embodiments of the invention, these should not be construed as limitations on the scope of the invention, but rather as an example of one embodiment thereof. For example, the above system can be used to create a private player network for use in, for example, the secure distribution and viewing of pre-released content. In this scenario, the content provider could use a common "user encryption key" that is possessed by all devices within the private network to generate a playback certification. In other embodiments, the content provider can issue a playback certification that is associated with a device identification number and multiple playback certifications could be embedded in content to enable a user to play the content on each registered device. In addition, a greater number of entities within the system (i.e., more than simply the registration entity and the content provider) can be provided with an opportunity to contribute to the generation of the playback certification. Furthermore, a variety of encryption techniques in addition to those described above can be used in the encryption of content and the various pieces of information included in the playback certification. As an additional security measure, information included in the playback certification can be scrambled using a scramble function or a predetermined sequence of scramble functions selected from a set of scramble functions. Accordingly, the scope of the invention should be determined not by the embodiments illustrated, but by the appended claims and their equivalents.

What is claimed is:

1. A method of decoding encrypted content using a playback device on which an active user encryption key is stored, where the content includes frames of video and at least a portion of a plurality of frames of video are encrypted using at least one frame encryption key, and the at least one frame encryption key is encrypted using a content encryption key, and copies of the content encryption key are separately encrypted using a plurality of different user encryption keys including the active user encryption key, the method comprising:

obtaining encrypted content using a playback device, where the content includes frames of video and at least a portion of a plurality of frames of video are encrypted using at least one frame encryption key;
   obtaining using the playback device a copy of the at least one frame encryption key that is encrypted using a content encryption key and copies of the content encryption key that are separately encrypted using a plurality of different user encryption keys including an active user encryption key stored on the playback device;

determining using the playback device which of the encrypted copies of the content encryption key was encrypted using the active user encryption key stored on the playback device;
decrypting the identified copy of the content encryption key using the playback device and the active user encryption key;
decrypting the at least one frame encryption key using the playback device and the decrypted content encryption key;
playing back frames of the encrypted content using the playback device, where playing back frames of the encrypted content further comprises:
identifying any portions of a frame that are encrypted;
identifying the frame encryption key used to encrypt the identified portions of the frame;
decrypting the encrypted portions of the frame using the identified frame encryption key; and
decoding the unencrypted frame of video.

2. The method of claim 1, wherein the encrypted copies of the content encryption key are entries in a table.

3. The method of claim 1, wherein the encrypted content is sent in response to a request from the playback device.

4. The method of claim 1, wherein the active user encryption key is encrypted by a base encryption key, where the base encryption key is inherent to the class of devices to which the playback device belongs.

5. The method of claim 1, wherein digital rights specified with respect to the content by a content provider are encrypted using at least one base encryption key, where the base encryption key is inherent to the class of devices to which the playback device belongs.

6. The method of claim 1, further comprising:
identifying, using the playback device, an active base encryption key for the particular class of device that is attempting to access the content; and
accessing, using the playback device, information concerning the type of playback parameters supported by a playback certification included with the content.

7. The method of claim 6, where the playback certification includes multiple base encryption keys.

8. The method of claim 7, where each of the base keys is identifiable using a unique identifier.

9. The method of claim 7, where each of the base encryption keys is used to encrypt the same information.

10. A playback device configured to playback encrypted content, where the content includes frames of video and at least a portion of a plurality of frames of video are encrypted using at least one frame encryption key, and the at least one frame encryption key is encrypted using a content encryption key, and copies of the content encryption key are separately encrypted using a plurality of different user encryption keys including the active user encryption key, the playback device comprising:
memory comprising a playback application;
a processor;
wherein the processor is configured by the playback application to:
obtain encrypted content, where the content includes frames of video and at least a portion of a plurality of frames of video are encrypted using at least one frame encryption key;
obtain a copy of the at least one frame encryption key that is encrypted using a content encryption key and copies of the content encryption key that are separately encrypted using a plurality of different user encryption keys including an active user encryption key stored on the playback device;
determine which of the encrypted copies of the content encryption key was encrypted using the active user encryption key stored on the playback device;
decrypt the identified copy of the content encryption key using the active user encryption key;
decrypt the at least one frame encryption key using the decrypted content encryption key;
play back frames of the encrypted content, where playing back frames of the encrypted content further comprises:
identifying any portions of a frame that are encrypted;
identifying the frame encryption key used to encrypt the identified portions of the frame;
decrypting the encrypted portions of the frame using the identified frame encryption key; and
decoding the unencrypted frame of video.

11. The playback device of claim 10, wherein the encrypted copies of the content encryption key are entries in a table.

12. The playback device of claim 10, wherein the encrypted content is sent in response to a request from the playback device.

13. The playback device of claim 10, wherein the active user encryption key is encrypted by a base encryption key, where the base encryption key is inherent to the class of devices to which the playback device belongs.

14. The playback device of claim 10, wherein digital rights specified with respect to the content by a content provider are encrypted using at least one base encryption key, where the base encryption key is inherent to the class of devices to which the playback device belongs.

15. The playback device of claim 10, wherein the processor is further configured by the playback application to:
identify an active base encryption key for the particular class of device that is attempting to access the content; and
access information concerning the type of playback parameters supported by a playback certification included with the content.

16. The playback device of claim 15, where the playback certification includes multiple base encryption keys.

17. The playback device of claim 16, where each of the base keys is identifiable using a unique identifier.

18. The playback device of claim 16, where each of the base encryption keys is used to encrypt the same information.

* * * * *